United States Patent [19]

Hughes

[11] Patent Number: 5,200,871
[45] Date of Patent: Apr. 6, 1993

[54] FLEXIBLE MAGNETIC DISC CASSETTES WITH INTEGRALLY MOLDED DRAG FINGERS

[75] Inventor: Patrick M. Hughes, Clinton, N.J.

[73] Assignee: Hoechst Celanese Corporation, Somerville, N.J.

[21] Appl. No.: 650,595

[22] Filed: Feb. 5, 1991

[51] Int. Cl.⁵ .......................................... G11B 23/033
[52] U.S. Cl. ..................................................... 360/133
[58] Field of Search ................ 360/133; 369/288, 290; 206/444

[56] References Cited

U.S. PATENT DOCUMENTS

| | | | |
|---|---|---|---|
| Re. 32,781 | 11/1988 | Takahashi | 360/133 |
| 3,845,502 | 10/1974 | Paus | 360/86 |
| 4,078,246 | 3/1978 | Berthoux et al. | 360/133 |
| 4,297,736 | 10/1981 | Manzke et al. | 360/133 |
| 4,436,201 | 3/1984 | Inaba | 206/444 |
| 4,445,155 | 4/1984 | Takahashi et al. | 360/99 |
| 4,481,552 | 11/1984 | Dona et al. | 360/97 |
| 4,517,617 | 5/1985 | Tsuji et al. | 360/133 |
| 4,590,532 | 5/1986 | Saito | 360/133 |
| 4,608,617 | 8/1986 | Oishi et al. | 360/133 |
| 4,613m,044 | 9/1986 | Saito et al. | 206/444 |
| 4,628,388 | 12/1986 | Kawabe | 360/128 |
| 4,630,156 | 12/1986 | Saito | 360/133 |
| 4,636,804 | 1/1987 | Kuder | 369/288 |
| 4,636,904 | 1/1987 | Matsuno | 360/133 |
| 4,669,078 | 5/1987 | Ogusu | 369/291 |
| 4,686,666 | 8/1987 | Dieffenbach | 369/290 |
| 4,698,714 | 10/1987 | Sugawara et al. | 360/133 |
| 4,710,913 | 12/1987 | Matsushima et al. | 369/280 |
| 4,796,140 | 1/1989 | Wakabayashi et al. | 360/133 |
| 4,821,124 | 4/1989 | Tamara | 360/133 |
| 4,885,653 | 12/1989 | Kato | 360/133 |
| 4,899,244 | 2/1990 | Morse | 360/133 |
| 4,903,224 | 2/1990 | Namiki et al. | 369/290 |
| 4,926,410 | 5/1990 | Suzuki et al. | 369/290 |
| 4,941,066 | 7/1990 | Swinburne et al. | 360/133 |
| 4,944,982 | 7/1990 | Kikuchi | 428/64 |
| 4,945,530 | 7/1990 | Sandell et al. | 369/291 |
| 5,090,010 | 2/1992 | Takahashi | 360/133 |
| 5,091,814 | 2/1992 | Ikebe et al. | 360/133 |

FOREIGN PATENT DOCUMENTS 0352918 1/1990 European Pat. Off. .

OTHER PUBLICATIONS

Patent Abstracts of Japan, vol. 9, No. 207, Aug. 24, 1985, Kokai No. 60-69872.
Patent Abstracts of Japan, vol. 10, No. 243, Aug. 21, 1986, Kokai No. 61-74188.

*Primary Examiner*—Stuart S. Levy
*Assistant Examiner*—Craig A. Renner
*Attorney, Agent, or Firm*—Nixon & Vanderhye

[57] ABSTRACT

A molded plastics cassette case for rotatably accommodating a flexible magnetic disc (preferably a nominal 3.5 inch diameter microdisc) includes at least one, and preferably several, drag finger integrally molded therewith. The drag finger has a base end which is structurally unitary with the cassette case, and a free terminal end, opposite to the base end, which imparts frictional drag resistance to the central hub of the flexible magnetic disc. In this manner, more reliable rotational velocity of the spinning magnetic disc may be achieved without the need for separate liner and lifter structures associated with conventional microdisc cassettes, thereby simplifying cassette construction and assembly.

16 Claims, 3 Drawing Sheets

FLEXIBLE MAGNETIC DISC CASSETTES WITH INTEGRALLY MOLDED DRAG FINGERS

FIELD OF INVENTION

The present invention relates generally to cassettes for flexible sheet-like discs of magnetic media. More specifically, the present invention relates to improved cassette constructions for flexible magnetic discs whereby the cassette case includes at least one (preferably several) integrally molded drag finger which exerts a small (but needed) amount of frictional drag against the spinning flexible magnetic disc during use in a magnetic recording/reproducing apparatus.

BACKGROUND AND SUMMARY OF THE INVENTION

Flexible sheet-like magnetic discs having a nominal standardized size of about 3.5 inches (so-called "microdiscs") are widely used in a variety of data storage/retrieval systems. For example, cassettes which include flexible magnetic discs are used in conjunction with personal computers so as to load data and/or programs into the central processing unit of the computer, as well as to store data in an off-site location in a more convenient manner.

When placed into service in a magnetic recording/reproducing apparatus, the magnetic disc (which is accommodated for rotational movement within the interior of the cassette case) is caused to spin relative to a magnetic read/write head by means of a motor-driven spindle coacting with an aperture in the central hub of the magnetic disc. The spindle, moreover, serves to center the magnetic disc relative to the magnetic read/write head so that accurate placement and retrieval of data onto and from the disc will ensue.

The motor-driven spindle and the aperture defined in the central hub of the magnetic disc typically coact with one another with close (but not ultrafine) tolerances. As a result, some "play" between the spindle and the aperture might be present which could translate into imprecise and/or varying rotational speed of the flexible magnetic disc during use.

As one means to counteract this problem, conventional flexible magnetic disc cassettes are provided with drag-inducing structures to impart slight drag against the magnetic disc so as to provide for more positive rotational velocity characteristics of the same during use. Typically, the drag-inducing structures will include a non-woven disc-shaped liner in confronting relationship to one face of the flexible magnetic disc, and a lifter (i.e., usually a relatively stiff polymeric film bent into the form of a leaf spring) located on an interior surface of the cassette case. The lifter serves to bias the liner into wiping contact with the surface of the magnetic disc which the liner confronts. The liner, due to its wiping contact with the surface of the magnetic disc, also serves to remove dust particles that may have accumulated thereon.

As can be appreciated, physical contact between the liner and the surface of the magnetic disc may abrade the magnetic disc surface and thus may, over time, degrade the quality and/or ability of the magnetic disc to magnetically store data. In addition, the separate liner and lifter associated with conventional flexible magnetic discs necessarily increase the manufacturing costs due to the increased labor/handling/assembly which such structures require. It is towards reducing (or eliminating entirely) these problems that the present invention is directed.

According to the present invention, cassette cases which house flexible magnetic discs are provided with integrally molded flexible drag fingers that have a free terminal end and which exert a beneficial frictional drag force against the central hub of the magnetic disc. The free ends of these flexible drag fingers thereby impart a small (but needed) amount of frictional drag against the central hub of the magnetic disc to thus cause the disc to spin more reliably during use in a recording/reproducing apparatus.

Most preferably, the drag fingers contact the central hub of the magnetic disc symmetrically relative to its perimeter. That is, the number and/or location of the drag fingers are such that the contact points between the free ends of the drag fingers and the central hub are substantially equally spaced apart about the periphery of the hub (e.g., substantially equal angular separation between the contact points).

Further aspects and advantages of the present invention will become more clear after careful consideration is given to the following detailed discussion thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
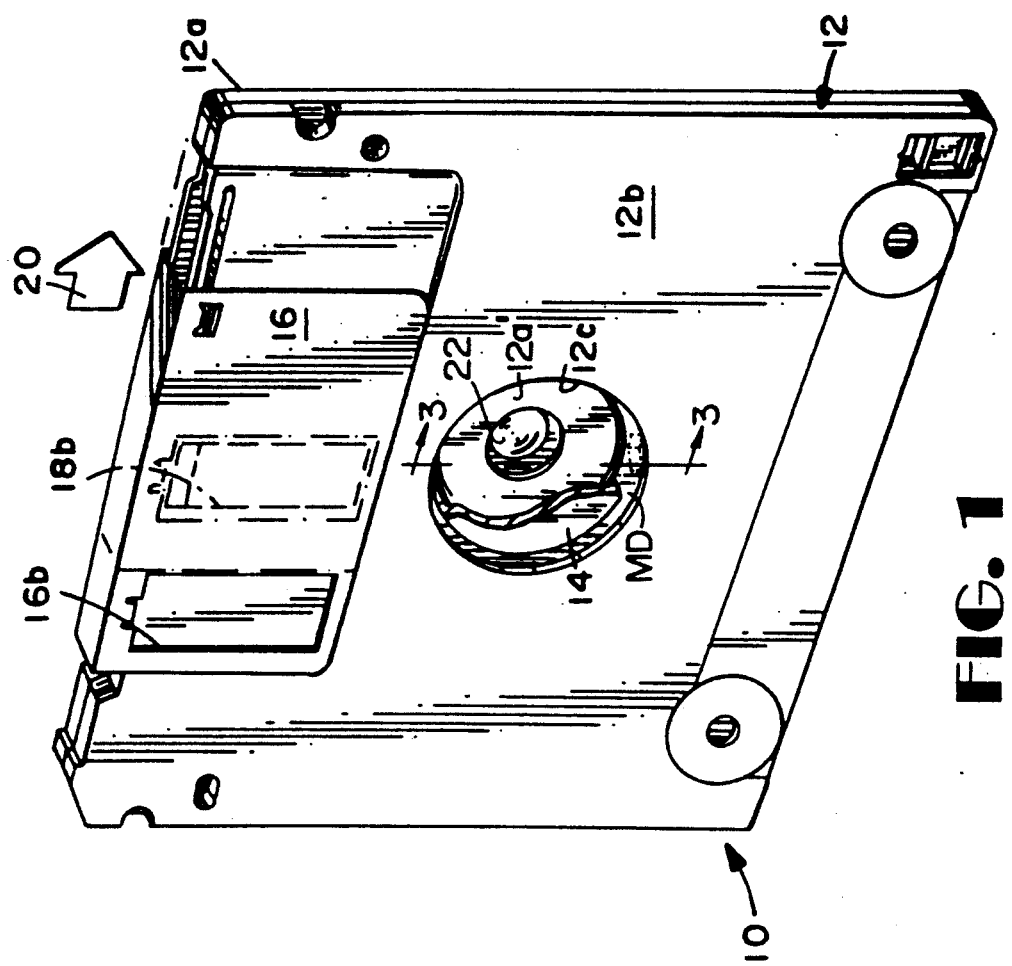
FIG. 1 is a perspective view of a flexible magnetic disc cassette according to the present invention.

Accompanying FIG. 1 shows a preferred embodiment of a flexible magnetic disc cassette 10 according to the present invention. The cassette 10 shown in FIG. 1 is, moreover, configured according to accepted industry standards for nominal 3.5-inch discs. In this regard, the cassette 10 includes a cassette case 12 having upper and lower cassette case halves 12a, 12b, respectively, joined to one another along their peripheral edges, for example. The lower cassette case half 12b defines an enlarged opening 12c which accommodates a drive carriage (not shown) associated with a conventional magnetic recording/reproducing apparatus. The drive carriage typically includes a centrally located spindle and a centering/drive pin (not shown) which coact with the drive aperture 14b and centering aperture 14a defined in the central hub 14 of the magnetic disc MD (see FIG. 5).

Figure 2:
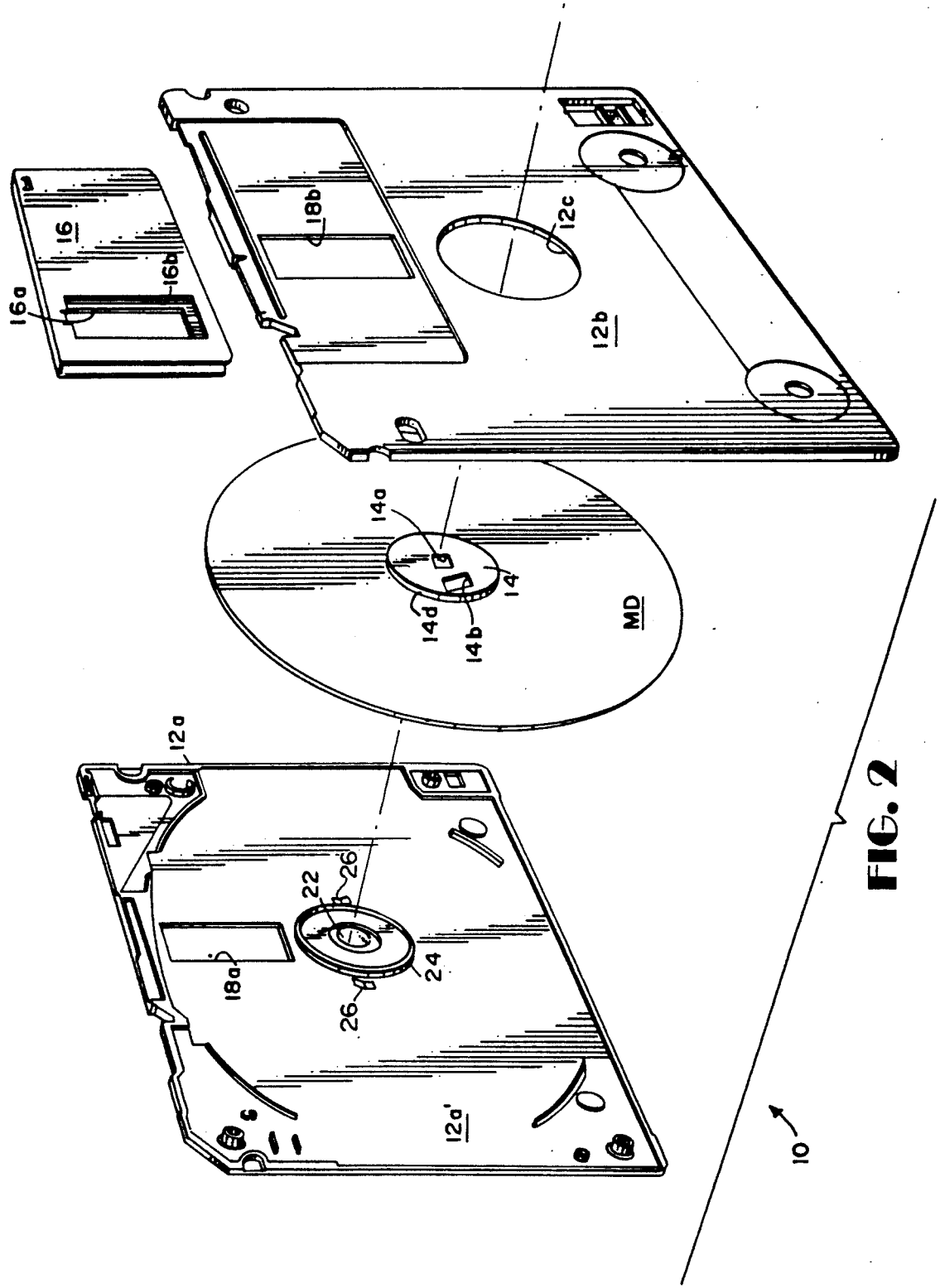
FIG. 2 is an exploded perspective view of the flexible magnetic disc cassette shown in FIG. 1.

The cassette case 12 will also have a movable shutter 16 which is biased via a spring element (not shown) in a direction whereby the shutter 16 is in a position which closes each of the access windows 18a, 18b defined in the upper and lower case halves 12a and 12b, respectively (see FIG. 2). The shutter 16 itself defines openings 16a, 16b on each of its sides which may be brought into registry with a respective one of the windows 18a, 18b when the shutter 16 is moved into its opened position (arrow 20 in FIG. 1) against the bias force of the spring element (not shown).

Movement of the shutter 16 into its opened position typically happens automatically when the cassette 10 is inserted into the input slot of a magnetic recording/reproducing apparatus. The magnetic read/write head of such recording/reproducing apparatus may thus be brought into operative association with the magnetic disc MD by virtue of the registry of the openings 16a, 16b with a respective one of the windows 18a, 18b.

The upper cassette case half 12a is most preferably provided with an integrally molded wear button 22 which projects outwardly from the interior surface 12a'. The wear button 22 provides a low friction surface against which the terminal end of the motor-driven spindle associated with the magnetic recording/reproducing apparatus bears during operation. The most preferred integrally molded wear button 22 is described more completely in commonly owned U.S. patent application Ser. No. 07/650,594 filed Feb. 5, 1991, the entire content of which is expressly incorporated hereinto by reference.

The interior surface 12a' of the upper cassette case half 12a is most preferably provided with a magnetic disc centering ring 24 integrally molded with, and protruding from, the interior surface 12a' of the upper cassette case half 12a in annular relationship to the wear button 22 as shown in accompanying FIG. 2. The centering ring 24 serves as a guide for the central hub 14 of the magnetic disc MD during use, and also prevents lateral slippage of the magnetic disc MD within the cassette case 12 (which could damage the same) during periods of nonuse.

Figure 3:
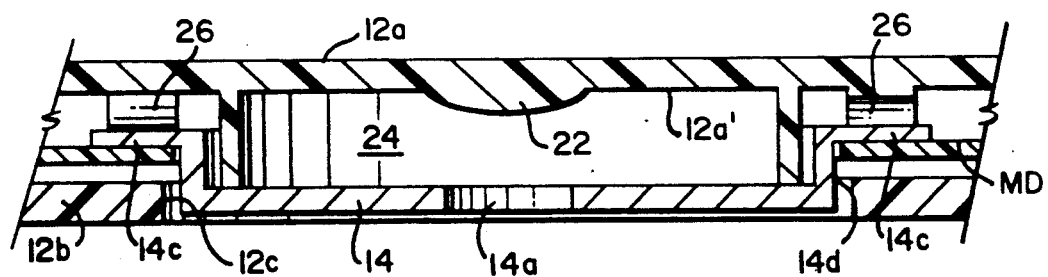
FIG. 3 is a partial cross-sectional view of the flexible magnetic disc cassette according to this invention as taken along line 3-3 in FIG. 1, and particularly showing one embodiment of the drag fingers integrally molded with the cassette case.

Important to the present invention, the upper cassette case half 12a is provided with integrally molded, outwardly projecting drag fingers 26. In the embodiment shown in FIGS. 1-3, the drag fingers 26 are most preferably symmetrically disposed about the periphery of the centering ring 24 and extend outwardly from the interior surface of the upper cassette case half 12a towards the central hub 14 of the magnetic disc MD. More specifically, since the drag fingers 26 are integrally molded with the upper cassette case half 12a, they each will have a base end that is structurally unitary with the upper cassette case half 12a, and an opposite terminal end that is free. It is this free terminal end of each of the drag fingers 26 which contacts the hub 14, and more specifically, the hub's annular magnetic disc mounting flange 14c, so as to impart a small amount of frictional drag to the spinning magnetic disc MD (through the hub 14) during use.

Figure 4:
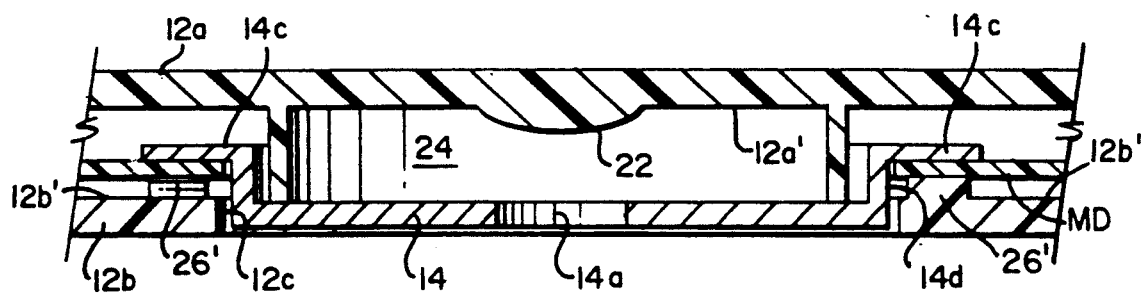
FIG. 4 is partial cross-sectional view of the flexible magnetic disc cassette which is similar to FIG. 3, but which shows another embodiment of the drag fingers integrally molded with the cassette case.

An alternative embodiment of the present invention is shown in accompanying FIG. 4. As is seen, the embodiment shown in FIG. 4 is similar to the embodiment of the invention shown and described above with respect to FIGS. 1-3, except that the drag fingers 26' extend outwardly from the interior surface 12b' of the lower cassette case half 12b. In this regard, the drag fingers 26', like drag fingers 26, are symmetrically disposed relative to the periphery of the centering ring 24, but impart an indirect frictional force against the mounting flange 14c of central hub 14 due to their bearing contact with the annular portion of the magnetic disc MD which is physically bonded to the mounting flange 14c. Since the annular portion of the magnetic disc MD is not used to magnetically store data, no concerns are presented by virtue of the free terminal ends of the drag fingers 26' being in bearing contact therewith.

The drag fingers 26 and 26' described above are integrally molded with the cassette case 12 such that they extend outwardly therefrom in a direction generally normal to the plane of the central hub 14. According to yet another embodiment of the present invention as depicted in accompanying FIGURE 5, a number of drag fingers 26" may be provided which project outwardly from the cassette case 12 generally parallel to the plane of the central hub 14.

Figure 5:
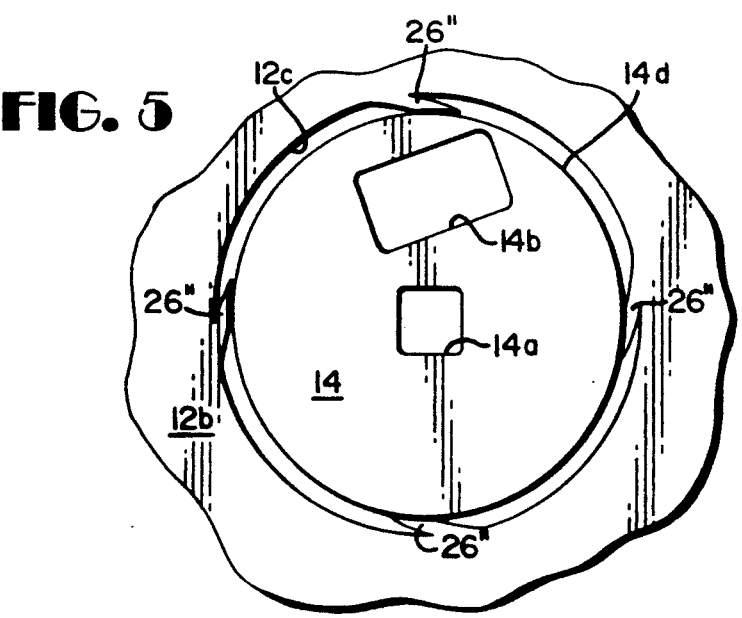
FIG. 5 is a partial plan view of the flexible magnetic disc cassette and particularly shows yet another embodiment of the drag fingers according to this invention.

As can be seen in FIG. 5, the symmetrically disposed pairs of drag fingers 26" are integrally molded (unitary) with the lower cassette case half 12b and project radially outwardly from the defined opening 12c towards the adjacent peripheral surface 14d of the central hub 14. The radially extending drag fingers 26", besides imparting the needed frictional drag against the peripheral surface 14d of the central hub 14, also serve as hub-centering means which minimizes lateral slippage of the hub (and hence the magnetic disc within the cassette case 12). Because of such hub-centering functions, the centering ring 24 is not necessarily needed and thus may be omitted, if desired.

The plastics material from which the cassette case 12 is formed (and thus the drag fingers 26, 26' and 26" since they are unitarily molded with the cassette case 12) will most preferably exhibit a wear factor versus steel of at least about 65 (ASTM D1894), a static coefficient of friction versus steel (40 psi) of at least about 0.14 (ASTM D1894), and a dynamic coefficient of friction versus steel (40 psi, 50 fpm) of at least about 0.21.

The preferred plastics material is an oxymethylene polymer having repeating oxymethylene ($-CH_2O-$) units. The oxymethylene polymers that may be satisfactorily employed according to the present invention can be either homopolymers (i.e., comprised solely of recurring oxymethylene units, exclusive of endcapping units), or copolymers (i.e., comprised mainly of recurring oxymethylene units randomly interspersed with higher oxyalkylene (preferably oxyethylene) units, exclusive of endcapping units). The preferred oxymethylene homopolymers may be made using the techniques disclosed in U.S. Pat. No. 2,768,994 to MacDonald, whereas the preferred oxymethylene copolymers may be made using the techniques disclosed in U.S. Pat. No. 3,027,352 to Walling (the entire content of each being expressly incorporated hereinto by reference).

Oxymethylene copolymers comprised mainly of recurring oxymethylene units interspersed with oxyethylene units are especially preferred. The most preferred oxymethylene copolymers are Celcon ® oxymethylene copolymers commercially available from Hoechst Celanese Corporation, Engineering Plastics Division, Short Hills, N.J. Most preferred is Celcon ® Grade MM3.5C polyoxymethylene copolymer.

If desired, the oxymethylene polymers may include additives typically employed in engineering resin compositions. Some of the additives that may be incorporated into oxymethylene polymers include antioxidants, UV stabilizers, free radical scavengers, lubricants, fillers, reinforcing media (e.g., glass fibers), colorants, and the like.

Although it is presently preferred that symmetrically disposed drag fingers be provided according to the present invention, it is entirely conceivable that a single integrally molded drag finger would be satisfactory during operation. Hence, any number of integrally molded drag fingers (including a single drag finger) may be provided with the flexible magnetic disc cassettes without departing from the present invention.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A flexible magnetic disc cassette comprising:
   a cassette case having upper and lower cassette case halves joined to one another to define an interior space; and
   a flexible planar magnetic disc having a central hub, said magnetic disc being positioned for rotational movement within said interior space between and parallel to said upper and lower cassette case halves, wherein
   said upper cassette case half includes a centering ring which prevents lateral slippage of said magnetic disc within said cassette case, and wherein
   at least one of said upper and lower cassette case halves include at least one integrally molded and outwardly extending drag finger positioned exteriorly of said centering ring, said at least one drag finger having a base end unitary with said one of said upper and lower cassette case halves, and a free terminal end, opposite to said base end, which imparts a frictional drag force against said central hub during said rotational movement of said magnetic disc.

2. A cassette as in claim 1, wherein a number of drag fingers are integrally molded with at least one of said upper and lower cassette case halves, each of said drag fingers being positioned exteriorly of said centering ring and having a base end unitary with said one of said upper and lower cassette case halves, and a free terminal end, opposite to said base end, which imparts a frictional draft force against said central hub of said magnetic disc.

3. A cassette as in claim 2, wherein said drag fingers are symmetrically disposes relative to said central hub.

4. A cassette as in claim 3, wherein at least one pair of said drag fingers is integrally molded with said upper cassette half.

5. A cassette as in claim 3, wherein at least one pair of said drag fingers is integrally molded with said lower cassette case half.

6. A cassette as in claim 3, wherein said hub has a peripheral surface, and wherein said drag fingers extend radially towards said peripheral surface of said hub such that said free terminal end of each is in contact therewith.

7. A cassette as in claim 1, said at least one of said upper and lower cassette halves and said at least one drag finger are integrally molded from an oxymethylene polymer.

8. A cassette as in claim 7, wherein said oxymethylene polymer is an oxymethylene copolymer comprised mainly of repeating oxymethylene units randomly interspersed with higher oxyalkylene units.

9. A cassette as in claim 8, wherein said higher oxyalkylene units are oxyethylene units.

10. A cassette case which rotatably accommodates a flexible magnetic disc having a central hub, said cassette case being formed of a molded plastics material and integrally includes (i) a centering ring which prevents lateral slippage of said magnetic disc within said cassette case, and (ii) at least one drag finger positioned laterally of said centering ring and having a base end that is unitary with said cassette case, and a free end opposite to said base end which imparts frictional drag resistance against said central hub during rotation of said magnetic disc within said cassette case.

11. A cassette as in claim 10, wherein said central hub includes a planar surface, and wherein said at least one drag finger extends generally perpendicularly with respect to said planar surface of said central hub.

12. A cassette as in claim 10, wherein said central hub includes a peripheral surface, and wherein said at least one drag finger extends radially with respect to said peripheral surface of said central hub.

13. A cassette as in claim 10, wherein a number of drag fingers are integrally molded with said cassette case, each of said drag fingers being positioned laterally of said centering ring and having a base end that is unitary with said cassette case, and a free end opposite to said base end which imparts frictional drag resistance against said central hub during rotation of said magnetic disc within said cassette case.

14. A cassette as in claim 10, wherein said cassette case and said at least one drag finger are integrally molded from an oxymethylene polymer.

15. A cassette as in claim 14, wherein said oxymethylene polymer is an oxymethylene copolymer comprised mainly of repeating oxymethylene units randomly interspersed with higher oxyalkylene units.

16. A cassette as in claim 15, wherein said higher oxyalkylene units are oxyethylene units.

* * * * *

UNITED STATES PATENT AND TRADEMARK OFFICE
CERTIFICATE OF CORRECTION

PATENT NO. : 5,200,871

DATED : April 6, 1993

INVENTOR(S) : Patrick M. HUGHES

It is certified that error appears in the above-identified patent and that said Letters Patent is hereby corrected as shown below:

Column 5, Claim 1, line 33, after "halves" change "include" to --includes--.

Column 5, Claim 3, line 2, after "symmetrically" change "disposes" to --disposed--.

Signed and Sealed this

Twenty-fifth Day of January, 1994

Attest:

BRUCE LEHMAN

Attesting Officer

Commissioner of Patents and Trademarks